(12) United States Patent
Suzuki et al.

(10) Patent No.: US 11,535,918 B2
(45) Date of Patent: Dec. 27, 2022

(54) METHOD FOR MANUFACTURING ALUMINUM ALLOY PLASTICALLY-PROCESSED ARTICLE

(71) Applicants: TOYOTA JIDOSHA KABUSHIKI KAISHA, Toyota (JP); KOBE STEEL, LTD., Kobe (JP)

(72) Inventors: Kazuhiro Suzuki, Miyoshi (JP); Takehito Kobayashi, Okazaki (JP); Masayuki Isogawa, Okazaki (JP); Katsuya Yoshida, Toyota (JP); Chihiro Asai, Toyota (JP); Masahiro Yamada, Toyota (JP); Masayuki Hori, Kuwana (JP)

(73) Assignees: TOYOTA JIDOSHA KABUSHIKI KAISHA, Toyota (JP); KOBE STEEL, LTD., Kobe (JP)

(*) Notice: Subject to any disclaimer, the term of this patent is extended or adjusted under 35 U.S.C. 154(b) by 164 days.

(21) Appl. No.: 16/950,056

(22) Filed: Nov. 17, 2020

(65) Prior Publication Data

US 2021/0180167 A1    Jun. 17, 2021

(30) Foreign Application Priority Data

Dec. 13, 2019 (JP) .............................. JP2019-225481

(51) Int. Cl.
   *C22F 1/04* (2006.01)
   *C22F 1/00* (2006.01)

(52) U.S. Cl.
   CPC ................. *C22F 1/04* (2013.01); *C22F 1/002* (2013.01)

(58) Field of Classification Search
   CPC .................................. C22F 1/04; C22F 1/002
   See application file for complete search history.

(56) References Cited

U.S. PATENT DOCUMENTS

| 2016/0186302 A1* | 6/2016 | Hatta ..................... C25D 11/16 205/325 |
| 2016/0237540 A1 | 8/2016 | Shikama et al. |
| 2018/0148815 A1* | 5/2018 | Shishido ................ C22C 21/02 |

FOREIGN PATENT DOCUMENTS

| CN | 105886860 A | 8/2016 |
| JP | 2015-101756 A | 6/2015 |

OTHER PUBLICATIONS

ASM Aluminum Alloys Handbook 2016 Heat Treatment 16.13 (Year: 2016).*

* cited by examiner

*Primary Examiner* — Anthony J Zimmer
*Assistant Examiner* — Nazmun Nahar Shams
(74) *Attorney, Agent, or Firm* — Sughrue Mion, PLLC (57) ABSTRACT

An object of the present disclosure is to provide a method for manufacturing an aluminum alloy plastically-processed article, capable of preventing a burning crack from occurring due to processing heat generated during plasticity processing while maintaining a solution-treatment temperature of an aluminum alloy material for ensuring a mechanical strength thereof. A method for manufacturing an aluminum alloy plastically-processed article, includes a step of performing a solution treatment for an aluminum alloy material by heating and maintaining the aluminum alloy material at a solution-treatment temperature, a step of performing plasticity processing for the aluminum alloy material subjected to the solution treatment, and steps of cooling the plastically-processed aluminum alloy material at a time at which the step of the plasticity processing is completed, and aging the cooled aluminum alloy material. The method further includes pre-plasticity-processing cooling step of cooling the aluminum alloy material subjected to the solution treatment.

4 Claims, 9 Drawing Sheets

METHOD FOR MANUFACTURING ALUMINUM ALLOY PLASTICALLY-PROCESSED ARTICLE

CROSS REFERENCE TO RELATED APPLICATIONS

This application is based upon and claims the benefit of priority from Japanese patent application No. 2019-225481, filed on Dec. 13, 2019, the disclosure of which is incorporated herein in its entirety by reference.

BACKGROUND

The present disclosure relates to a method for manufacturing an aluminum alloy plastically-processed article. In particular, the present disclosure relates to a method for manufacturing an aluminum alloy plastically-processed article, including a solution treatment step.

In a method for manufacturing an aluminum alloy plastically-processed article like the one described above, after a solution treatment is performed for an aluminum alloy material, plasticity processing is performed for the aluminum alloy material, which has been subjected to the solution treatment, before the aluminum alloy material is cooled. Further, when necessary, an aging treatment is performed for the plastically-processed aluminum alloy material. Japanese Unexamined Patent Application Publication No. 2015-101756 discloses such a method for manufacturing an aluminum alloy plastically-processed article.

SUMMARY

The present inventors have found the following problem.

It is required to make an aluminum alloy plastically-processed article have a predetermined mechanical strength. Therefore, it is conceivable to raise the temperature of the solution treatment (hereinafter also referred to as the solution-treatment temperature) in the solution treatment step to or close to the upper limit value thereof. However, if the solution-treatment temperature of the aluminum alloy material is simply raised, in some cases a burning crack occurs due to the processing heat generated during the plasticity processing.

Figure 8:
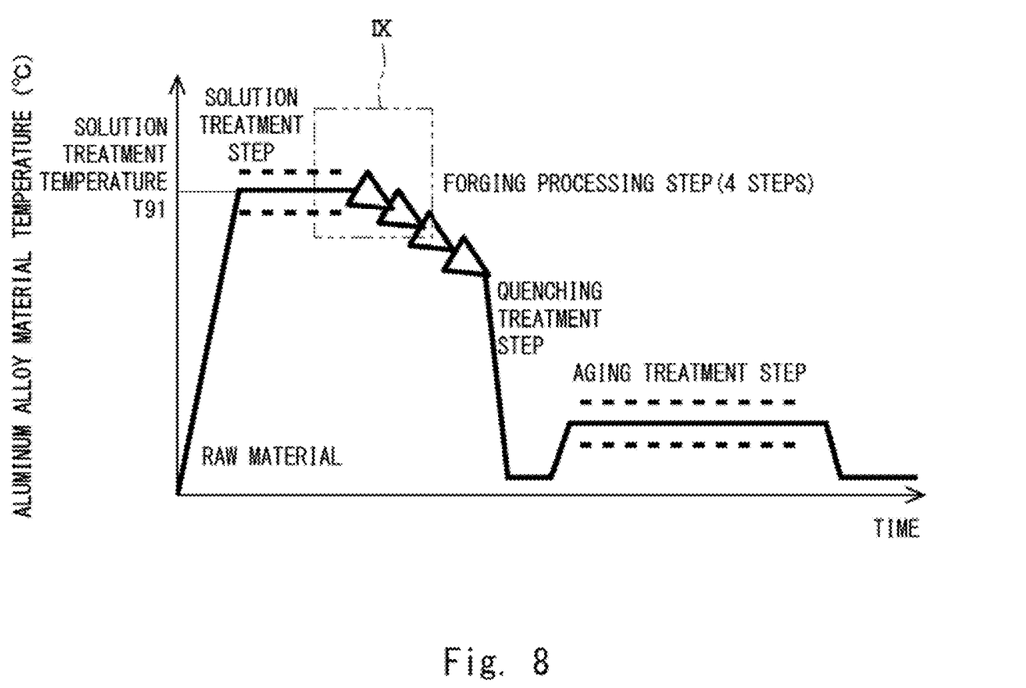
FIG. 8 is a graph showing a hysteresis curve of the temperature of an aluminum alloy material in a prior-art manufacturing process.

A specific example of the above-described method for manufacturing an aluminum alloy plastically-processed article is described below. FIG. 8 shows a hysteresis curve of the temperature of an aluminum alloy material according to the specific example of the manufacturing method. As shown in FIG. 8, in this example of the manufacturing method, a solution treatment step, a forging processing step, which is an example of the plasticity processing, a quenching treatment step, and an aging treatment step are performed in this order for the aluminum alloy material.

Figure 9:
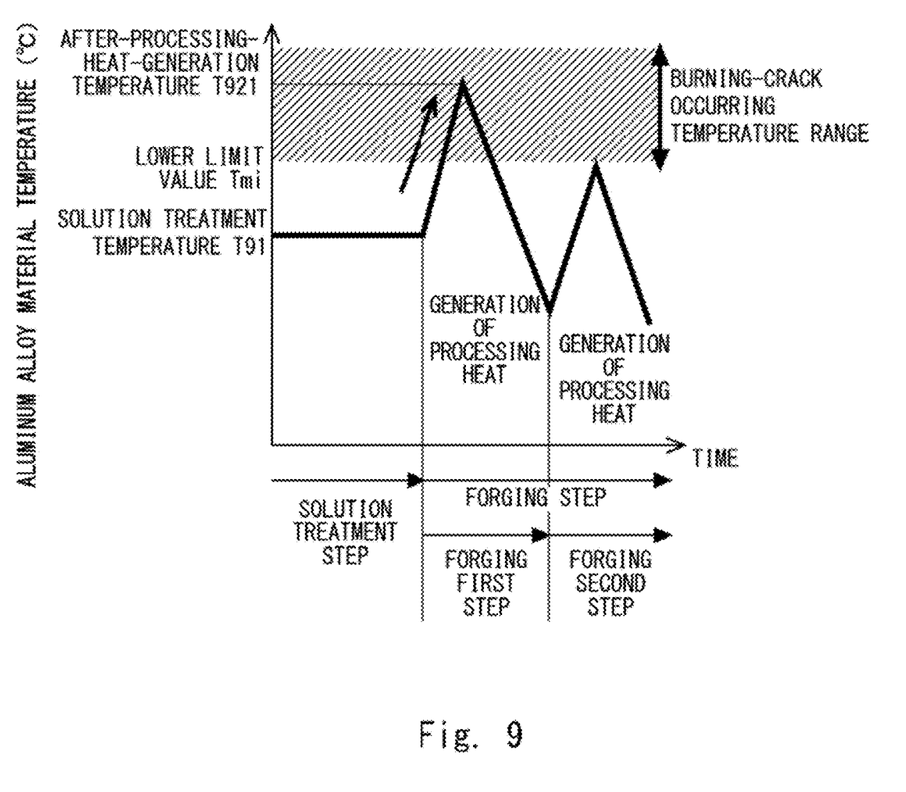
FIG. 9 is a graph showing a main part of the hysteresis curve of the temperature of the aluminum alloy material in the prior-art manufacturing method.

FIG. 9 shows a main part of the hysteresis curve of the temperature of the aluminum alloy material in the example of the manufacturing method. As shown in FIG. 9, after the solution treatment step, when the aluminum alloy material is forged, processing heat is generated. As a result, the temperature of the aluminum alloy material rises from a solution-treatment temperature T91, exceeds a lower-limit value Tmi of a burning-crack occurring temperature range, and reaches an after-processing-heat-generation temperature T921. Since the after-processing-heat-generation temperature T921 is within the burning-crack occurring temperature range, burning cracks occur in the aluminum alloy material.

The present disclosure provides a method for manufacturing an aluminum alloy plastically-processed article, capable of preventing a burning crack from occurring due to processing heat generated during plasticity processing while maintaining a solution-treatment temperature of an aluminum alloy material for ensuring a mechanical strength thereof.

A first exemplary aspect is a method for manufacturing an aluminum alloy plastically-processed article, including:

performing a solution treatment for an aluminum alloy material by heating and maintaining the aluminum alloy material at a solution-treatment temperature T1;

performing plasticity processing for the aluminum alloy material subjected to the solution treatment; and cooling the plastically-processed aluminum alloy material upon completing the plasticity processing, and aging the cooled aluminum alloy material, in which the method further includes, before starting the plasticity processing, a pre-plasticity-processing cooling step of cooling the aluminum alloy material subjected to the solution treatment while maintaining the aluminum alloy material subjected to the solution treatment in a solution state.

According to the above-described feature, the temperature of the aluminum alloy material is equal to or higher than the lower limit value of the solution-treatment temperature T1 in the above-described cooling step, so that it is possible to maintain the solution-treatment temperature of the aluminum alloy material. Therefore, it is possible to ensure an excellent mechanical strength of the aluminum alloy plastically-processed article. Further, even if processing heat is generated in the aluminum alloy material during the plasticity processing, the temperature of the aluminum alloy material is less likely to rise to a temperature at which a burning crack occurs. Therefore, it is possible to prevent a burning crack from occurring due to the processing heat generated during the plasticity processing.

Further, in the pre-plasticity-processing cooling step, after the aluminum alloy material subjected to the solution treatment is cooled, a temperature T2 of the cooled aluminum alloy material may be adjusted so that, in the plasticity processing step, a temperature T21 of the aluminum alloy material which has been subjected to the plasticity processing and hence in which processing heat has been generated remains lower than a lower limit value Tmi of a burning-crack occurring temperature range. Further, in the pre-plasticity-processing cooling step, after the aluminum alloy material subjected to the solution treatment is cooled, a temperature T2 of the cooled aluminum alloy material may be equal to or higher than a temperature 45° C. lower than a lower limit value Tmi of a burning-crack occurring temperature range and equal to or lower than a temperature 10° C. lower than the lower limit value Tmi of the burning-crack occurring temperature range.

According to the above-described feature, the aluminum alloy material is sufficiently cooled. Therefore, it is possible to prevent the temperature of the aluminum alloy material from reaching the burning-crack occurring temperature range even if processing heat is generated due to the plasticity processing. Therefore, it is possible to stably prevent a burning crack from occurring due to the processing heat generated during the plasticity processing.

Further, the solution-treatment temperature T1 may be equal to or higher than a temperature 65° C. lower than a lower limit value Tmi of a burning-crack occurring temperature range and equal to or lower than a temperature 5° C. lower than the lower limit value Tmi of the burning-crack occurring temperature range.

According to the above-described feature, it is possible, by limiting the range of the solution-treatment temperature to a predetermined range, to stably prevent a burning crack from occurring due to the processing heat generated during the plasticity processing while ensuring an excellent mechanical strength of the aluminum alloy plastically-processed article.

According to the present disclosure, it is possible to prevent a burning crack from occurring due to processing heat generated during plasticity processing while maintaining a solution-treatment temperature of an aluminum alloy material for ensuring a mechanical strength thereof.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the below-shown embodiments. Further, for clarifying the explanation, the following description and drawings are simplified as appropriate.

Embodiment

Figure 1:
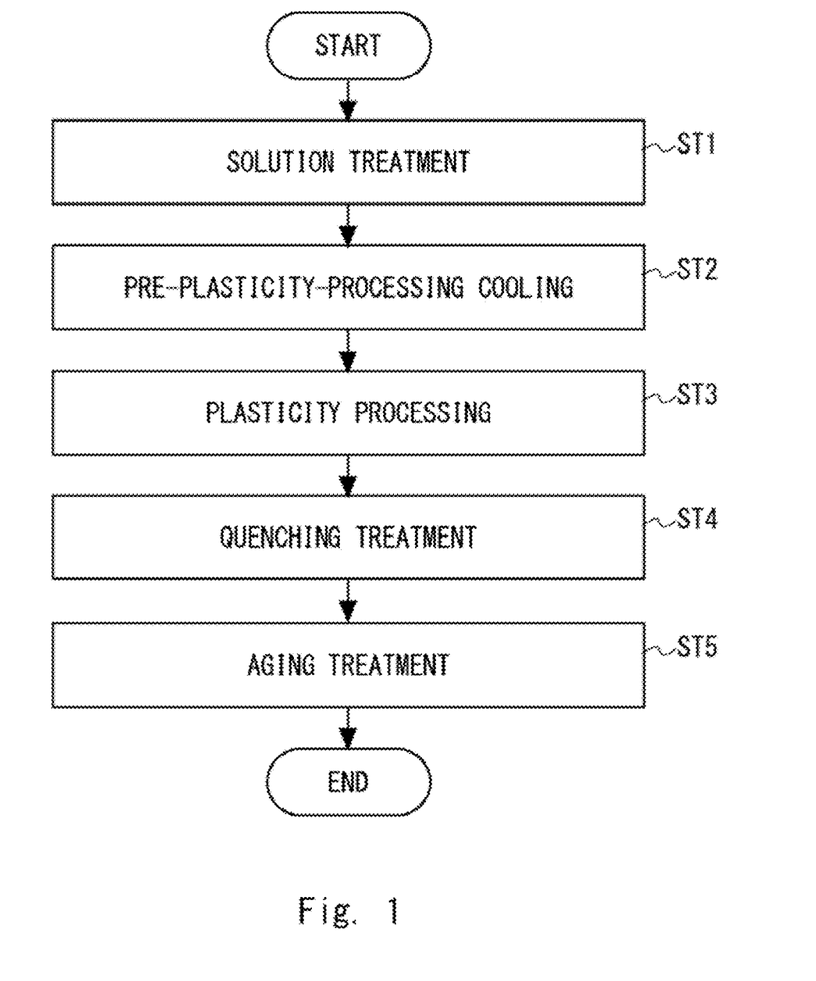
FIG. 1 is a flowchart showing an example of a manufacturing method according to an embodiment.
Figure 2:
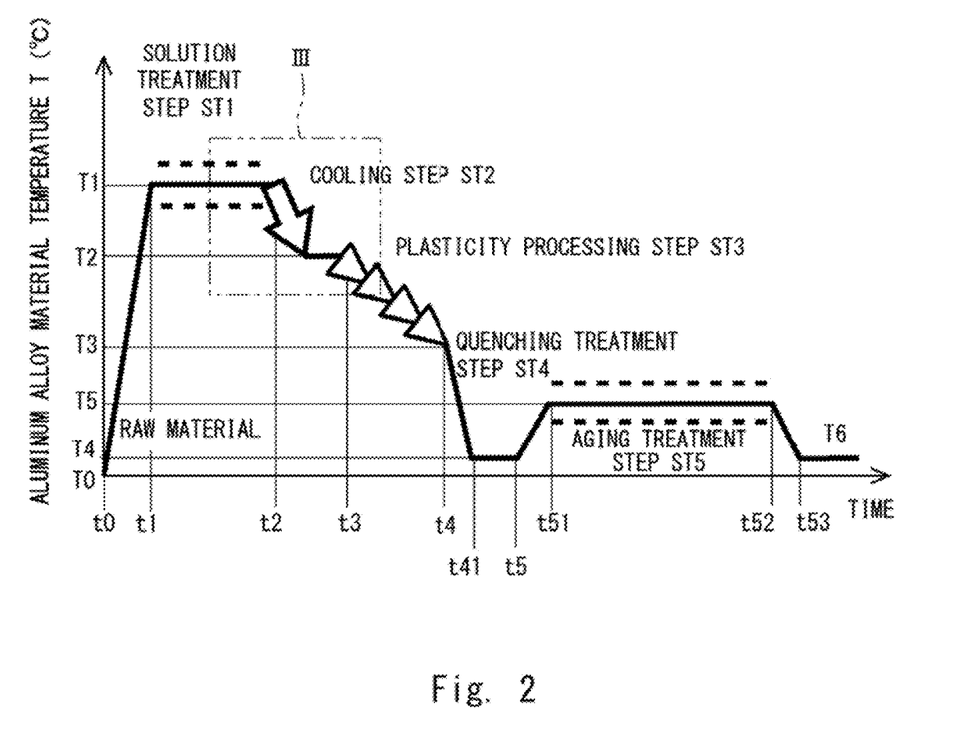
FIG. 2 is a graph showing a hysteresis curve of the temperature of an aluminum alloy material in an example of a manufacturing method according to an embodiment.
Figure 3:
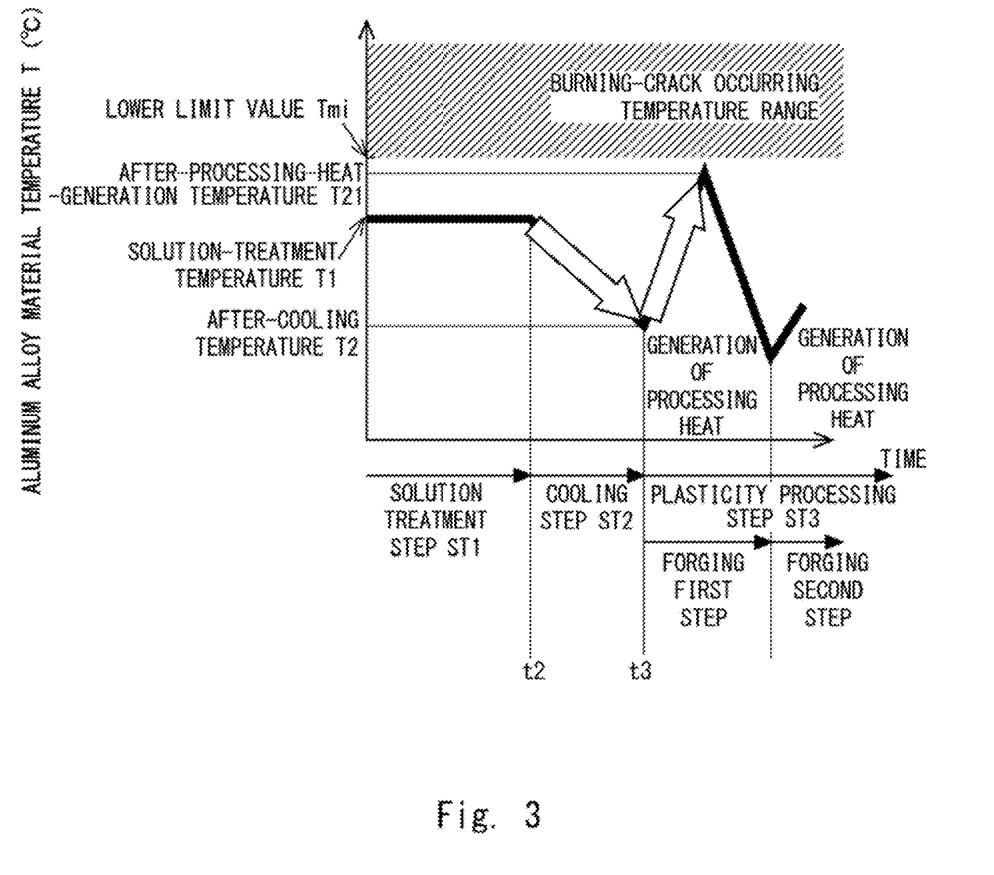
FIG. 3 is a graph showing a main part of the hysteresis curve of the temperature of the aluminum alloy material in the example of the manufacturing method according to the embodiment.

An embodiment will be described with reference to FIGS. 1 to 3. FIG. 1 is a flowchart showing an example of a manufacturing method according to the embodiment. FIG. 2 is a graph showing a hysteresis curve of the temperature of an aluminum alloy material in the example shown in FIG. 1. FIG. 3 shows a main part of the hysteresis curve of the temperature shown in FIG. 2.

After an aluminum alloy material is heated to a solution-treatment temperature T1, a solution treatment is performed for this aluminum alloy material by heating and maintaining the aluminum alloy material at the solution-treatment temperature T1 from a solution treatment start time t1 to a solution treatment end time t2 (Solution Treatment Step ST1).

As the aluminum alloy material, for example, a heat-treatment-type aluminum alloy can be used. An Al—Mg—Si alloy (a 6000-series alloy) can be used as such a heat-treatment-type aluminum alloy. As such a 6000-series alloy, for example, an A6061 alloy, a 6110 alloy in conformity with the AA standards, or the like can be used. Note that, for example, the A6061 alloy is composed of, by mass %, 0.40-0.8% of Si, 0.7% or less of Fe, 0.15-0.40% of Cu, 0.15% or less of Mn, 0.8-1.2% of Mg, 0.04-0.35% of Cr, 0.25% or less of Zn, 0.15% or less of Ti, and a remnant composed of Al (aluminum) and unavoidable impurities. In this solution treatment step ST1, a commercially-available heat treatment furnace can be used. The heat treatment furnace may be one that can stably control the temperature of the aluminum alloy material within a range of ±5° C. of a target temperature.

The solution-treatment temperature T1 may be any temperature within a predetermined temperature range in which the aluminum alloy material is in a solution state. The solution-treatment temperature T1 may be, for example, equal to or higher than a temperature 65° C. lower than the lower limit value Tmi of a burning-crack occurring temperature range (i.e., equal to or higher than a temperature expressed as "Tmi−65° C.") and equal to or lower than a temperature 5° C. lower than the lower limit value Tmi of the burning-crack occurring temperature range (i.e., equal to or lower than a temperature expressed as "Tmi-5° C."). The burning-crack occurring temperature range of the aluminum alloy material is determined according to the constituent components of the aluminum alloy material. Specifically, the solution-treatment temperature T1 may be, for example, no lower than 515° C. and no higher than 560° C. The upper limit value of the range of the solution-treatment temperature T1 may be any one of 560° C., 550° C., 545° C. and 540° C. The lower limit value of the range of the solution-treatment temperature T1 may be any one of 515° C., 520° C., 530° C., 535° C. and 540° C.

The solution-treatment temperature T1 may be equal to or higher than a temperature 65° C. lower than the lower limit value Tmi of the burning-crack occurring temperature range, so that solute elements are sufficiently solid-dissolved with the aluminum solid solution in the aluminum alloy material and hence the solution treatment for the aluminum alloy material is sufficiently carried out. The solution-treatment temperature T1 may be equal to or higher than 550° C., so that the solution treatment for the aluminum alloy material further progresses and hence a predetermined mechanical strength of the aluminum alloy plastically-processed article can be ensured. The solution-treatment temperature T1 may be equal to or lower than a temperature 5° C. lower than the lower limit value Tmi of the burning-crack occurring temperature range, so that occurrences of burning cracks can be prevented in the subsequent plasticity processing step ST3.

In the solution treatment step ST1, the solution treatment time t1 to t2 may be a predetermined time in which the solution treatment for the aluminum alloy material can be sufficiently carried out in order to ensure the mechanical strength thereof required as the aluminum alloy plastically-processed article. The solution treatment time t1 to t2 may be, for example, one hour or longer.

Next, as shown in FIGS. 2 and 3, the aluminum alloy material is cooled to an after-cooling temperature T2 (Pre-plasticity-processing Cooling Step ST2). The after-cooling temperature T2 may be such a temperature that even if processing heat is generated in the aluminum alloy material because of the plasticity processing in the plasticity processing step ST3, the temperature of the aluminum alloy material remains lower than the lower limit value Tmi of the burning-crack occurring temperature range. In the plasticity processing step ST3, the temperature of the aluminum alloy material may be lower than the lower limit value Tmi of the burning-crack occurring temperature range, so that burning cracks are less likely to occur.

Further, the after-cooling temperature T2 may be equal to or higher than a temperature 45° C. lower than the lower limit value Tmi of the burning-crack occurring temperature range (i.e., equal to or higher than a temperature expressed as "Tmi−45° C.") and equal to or lower than a temperature 10° C. lower than the lower limit value Tmi of the burning-crack occurring temperature range (i.e., equal to or lower than a temperature expressed as "Tmi−10° C."). Specifically, the after-cooling temperature T2 may be, for example, no lower than 520° C. and no higher than 553° C. In other words, the aluminum alloy material may be cooled to a temperature that is equal to or lower than the temperature 10° C. lower than the lower limit value Tmi of the burning-crack occurring temperature range. This is because when the after-cooling temperature T2 is equal to or lower than the temperature 10° C. lower than the lower limit value Tmi of the burning-crack occurring temperature range, the temperature of the aluminum alloy material can be stably controlled in a range of ±5° C. of a target temperature in most of the heat treatment furnaces and hence occurrences of burning cracks can be stably prevented. The after-cooling temperature T2 may be changed as appropriate according to the shape of the aluminum plastically-processed article. In the pre-plasticity-processing cooling step ST2, air may be used as a cooling medium. For example, the aluminum alloy material can be cooled by leaving it in the atmosphere. Note that in the pre-plasticity-processing cooling step ST2, there is no need to blow air onto the aluminum alloy material.

Next, the aluminum alloy material is plastically processed from a plasticity processing start time t3 to a quenching treatment start time t4 (Plasticity Processing Step ST3). The plasticity processing may be any of a wide variety of processing. For example, the plasticity processing may be forging, pressing, rolling, or the like. An example of the plasticity processing in the plasticity processing step ST3 in FIG. 3 is forging processing. The forging processing includes at least one step of applying a pressure to the aluminum alloy material. The forging processing includes, for example, a rough processing step, a finishing processing step, a deburring processing step, and the like.

As shown in FIG. 3, in a forging first step, processing heat is generated in the aluminum alloy material and the temperature of the aluminum alloy material rises from the after-cooling temperature T2 to an after-processing-heat-generation temperature T21. The after-processing-heat-generation temperature T21 may be lower than the lower limit value Tmi of the burning-crack occurring temperature range. Further, after the temperature of the aluminum alloy material becomes lower than the after-cooling temperature T2, a forging second step is performed. In each of the second and subsequent steps, the above-described forging step is repeated in a similar manner. Upon completion of the plasticity processing step ST3, the temperature of the aluminum alloy material decreases from the after-cooling temperature T2 to an after-plasticity-processing temperature T3 shown in FIG. 2.

Next, as shown in FIG. 2, a quenching treatment is performed for the aluminum alloy material by quickly cooling (i.e., quenching) the aluminum alloy material to a predetermined quenching treatment temperature T4 and maintaining the aluminum alloy material at that temperature from a quenching treatment temperature keeping start time t41 to a quenching treatment temperature keeping end time t5, i.e., maintaining the aluminum alloy material at the temperature for a predetermined quenching treatment time t41 to t5 (Quenching Treatment Step ST4). For example, the aluminum alloy material is quickly cooled by submerging it in water. Further, the quenching treatment temperature T4 is, for example, no lower than 20° C. and no higher than 60° C. The quenching treatment time t41 to t5 is, for example, no shorter than 15 seconds and no longer than 70 seconds. By maintaining the aluminum alloy material as described above, the aluminum alloy material can be stably quenched. In this quenching treatment step ST4, a commercially-available quenching tank can be used.

Lastly, an aging treatment is performed for the aluminum alloy material by heating and maintaining the aluminum alloy material at an aging treatment temperature T5 from an aging treatment temperature keeping start time t51 to an aging treatment temperature keeping end time t52, i.e., heating and maintaining the aluminum alloy material for a predetermined aging treatment time t51 to t52 (Aging Treatment Step ST5). The aging treatment temperature T5 is, for example, no lower than 160° C. and no higher than 220° C. The aging treatment time t51 to t52 is, for example, no shorter than 0.5 hours and no longer than 10 hours. By controlling the aging temperature T5 and the aging time t51 to t52 within the respective predetermined ranges, the aluminum alloy material can be stably aged. In this aging process ST5, a commercially-available aging furnace can be used.

As described above, according to the above-described method for manufacturing an aluminum alloy forged article, in the cooling step ST2, the temperature of the aluminum alloy material is equal to or higher than the lower limit value of the solution-treatment temperature T1 and hence the solution-treatment temperature T1 can be maintained. Therefore, it is possible to ensure an excellent mechanical strength of the aluminum alloy plastically-processed article. Further, even if processing heat is generated in the aluminum alloy material during the plasticity processing, the after-processing-heat-generation temperature T21 of the aluminum alloy material is less likely to rise to the lower limit value Tmi of the burning-crack occurring temperature range. Therefore, it is possible to prevent a burning crack from occurring due to the processing heat generated during the plasticity processing.

Further, in the pre-plasticity-processing cooling step ST2 according to this embodiment, after the aluminum alloy material is cooled, the after-cooling temperature T2 of the aluminum alloy material may be adjusted so that the after-processing-heat-generation temperature T21 remains lower than the lower limit value Tmi of the burning-crack occurring temperature range in the plasticity processing step ST3. Further, the after-cooling temperature T2 of the aluminum alloy material may be equal to or higher than a temperature 45° C. lower than the lower limit value Tmi of the burning-crack occurring temperature range and equal to or lower than a temperature 10° C. lower than the lower limit value Tmi of the burning-crack occurring temperature range. As a result, since the range of the after-cooling temperature T2 is limited, the after-processing-heat-generation temperature T21 of the aluminum alloy material is more likely to remain lower than the lower limit value Tmi of the burning-crack occurring temperature range. As described above, the temperature of the aluminum alloy material for workpieces can be stably controlled in a range of ±5° C. of a target temperature in most of the heat treatment furnaces. Therefore, since the temperature of the cooled aluminum alloy material is equal to or lower than the temperature 10° C. lower than the lower limit value Tmi of the burning-crack occurring temperature range, even if processing heat is generated in the plasticity processing step ST3, the after-processing-heat-generation temperature T21 of the aluminum alloy material reliably remains lower than the lower limit value Tmi of the burning-crack occurring temperature range. Therefore, it is possible to stably prevent a burning crack from occurring due to the processing heat generated during the plasticity processing in the plasticity processing step ST3.

Further, the solution-treatment temperature T1 according to this embodiment is equal to or higher than a temperature 65° C. lower than the lower limit value Tmi of the burning-crack occurring temperature range and equal to or lower than a temperature 5° C. lower than the lower limit value Tmi of the burning-crack occurring temperature range. As a result, since the solution-treatment temperature T1 is equal to or higher than the temperature 65° C. lower than the lower limit value Tmi of the burning-crack occurring temperature range, the solution treatment of the aluminum alloy material further progresses and hence the predetermined mechanical strength of the aluminum alloy plastically-processed article can be ensured. Further, since the solution-treatment temperature T1 is equal to or lower than the temperature 5° C. lower than the lower limit value Tmi of the burning-crack occurring temperature range, even if processing heat is generated during the plasticity processing in the plasticity processing step ST3, the temperature of the aluminum alloy material is less likely to reach the lower limit value Tmi of the burning-crack occurring temperature range. That is, it is possible to stably prevent a burning crack from occurring.

Example

Figure 4:
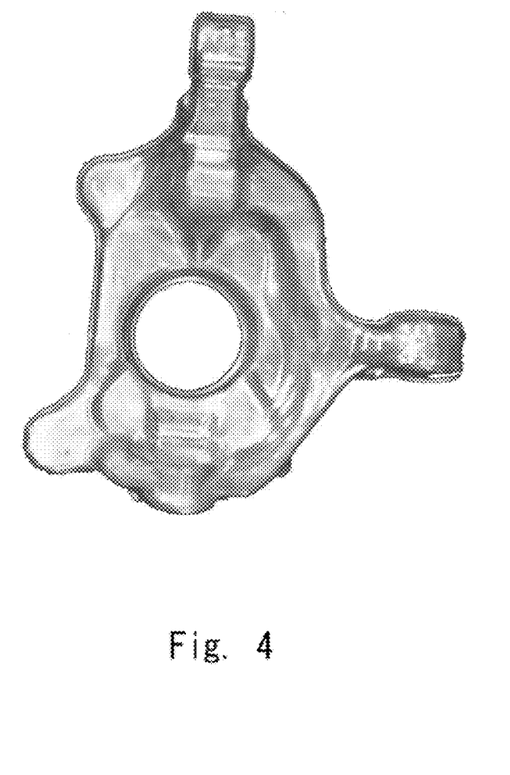
FIG. 4 is a photograph showing a specific example of a product manufactured by a manufacturing method according to an embodiment.
Figure 5:
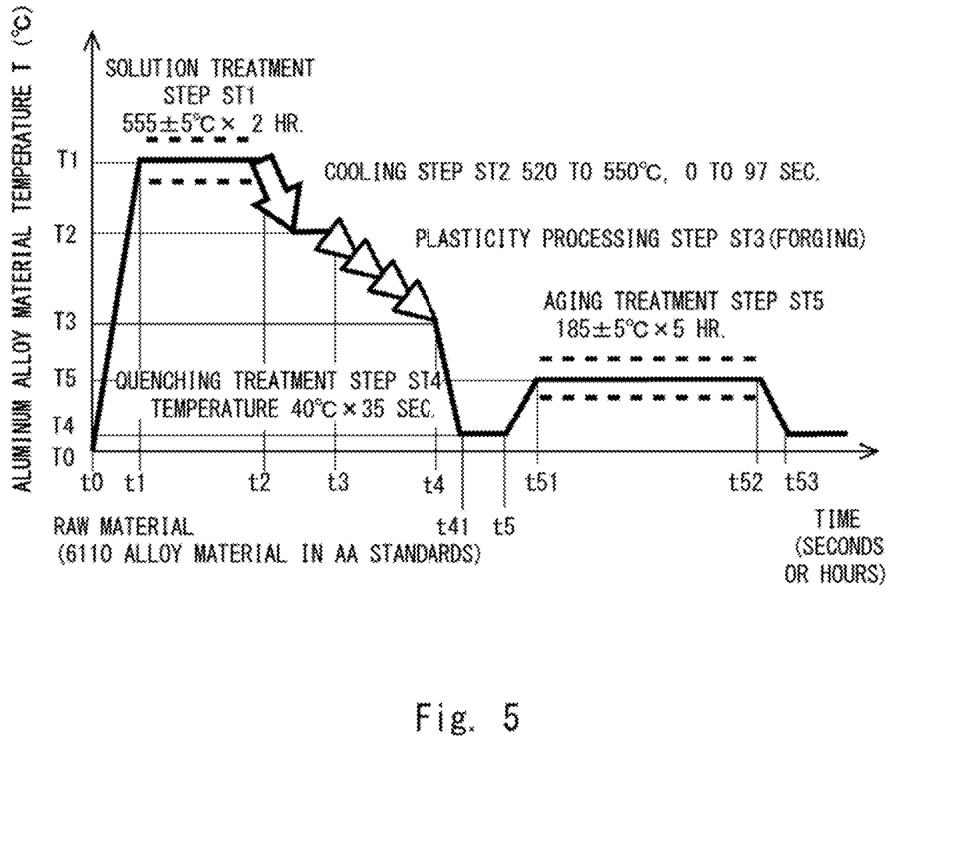
FIG. 5 is a graph showing a specific example of a hysteresis curve of the temperature of an aluminum alloy material in an example of a manufacturing method according to an embodiment.
Figure 6:
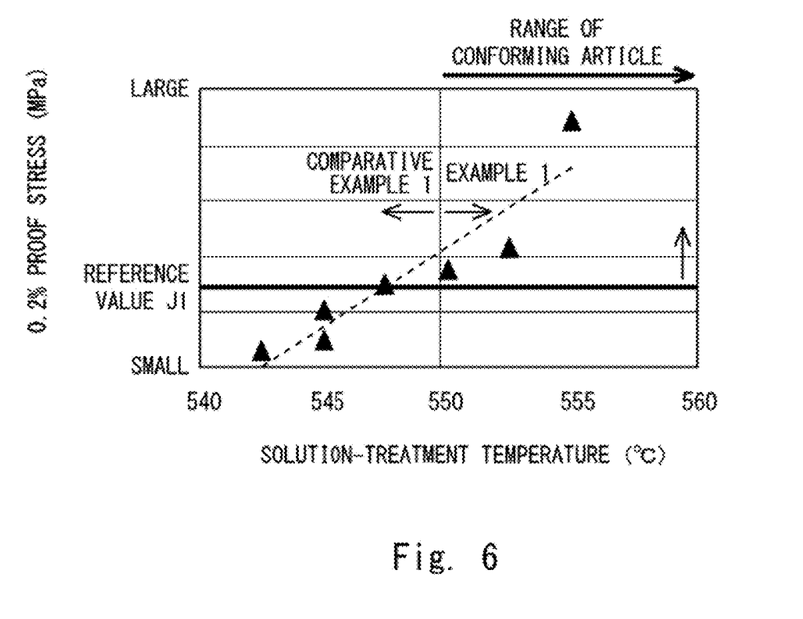
FIG. 6 is a graph showing 0.2% proof stresses for solution-treatment temperatures.
Figure 7:
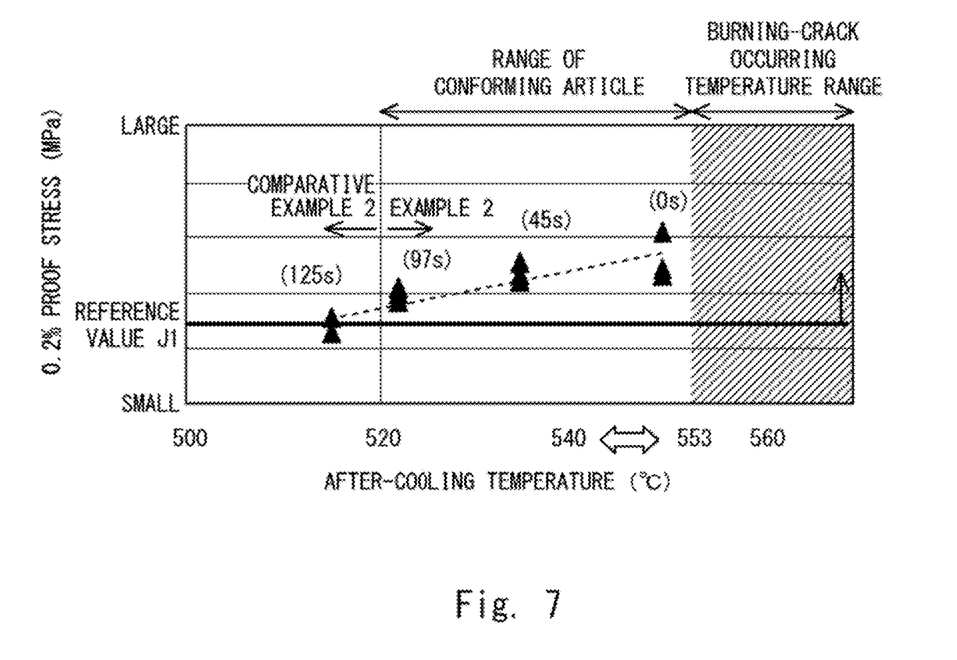
FIG. 7 is a graph showing 0.2% proof stresses for after-cooling temperatures.

Next, an example of the above-described method for manufacturing an aluminum alloy plastically-processed article according to the above-described embodiment will be described with reference to FIGS. 4 to 7. FIG. 4 is a photograph showing a specific example of a product manufactured by the manufacturing method according to the embodiment. FIG. 5 is a graph showing a specific example of a hysteresis curve of the temperature of an aluminum alloy material in an example of the manufacturing method according to the embodiment. FIG. 6 is a graph showing 0.2% proof stresses for solution-treatment temperatures. FIG. 7 is a graph showing 0.2% proof stresses for after-cooling temperatures.

As shown in FIG. 4, aluminum alloy plastically-processed articles according to examples and comparative examples were forged knuckles. These knuckles may be used in a four-wheeled vehicle.

Aluminum alloy plastically-processed articles according to the Examples 1 and 2 were manufactured under the manufacturing conditions shown in FIG. 5 by using the above-described method for manufacturing an aluminum alloy plastically-processed article according to the embodiment. The solution-treatment temperature T1 was adjusted to 555±5° C. or lower, and the solution treatment time t1 to t2 was two hours. The after-cooling temperature T2 was no lower than 520° C. and no higher than 550° C., and the cooling time t2 to t3 was 0 seconds, 45 seconds, or 97 seconds. The quenching treatment temperature T4 was adjusted to 40° C., and the quenching treatment time t41 to t5 was 35 seconds. The aging treatment temperature T5 was adjusted to 185±5° C., and the aging treatment time t51 to t52 was five hours.

In the plasticity processing step ST3, a forging method was used. The aluminum alloy material according to the Examples 1 and 2 corresponds to a 6110 alloy in conformity with the AA standards, and this 6110 alloy can be produced by using a material equivalent to an A6061 material alloy and changing the constituent components thereof. The range of the component composition of the 6110 alloy is within the range of the component composition of the A6061 material alloy.

In the Example 1, the solution-treatment temperature T1 was no lower than 550° C. and no higher than 560° C., and the after-cooling temperature T2 was 540° C.±5° C. In the Example 2, the solution-treatment temperature T1 was 550° C., and the after-cooling temperature T2 was no lower than 520° C. and no higher than 550° C. Further, the cooling time t2 to t3 was 0 seconds, 45 seconds, or 97 seconds.

Note that Comparative Examples 1 and 2 were manufactured by using the same manufacturing method as that for the Examples 1 and 2 except for the solution-treatment temperature T1 and the after-cooling temperature T2. In the Comparative Example 1, the solution-treatment temperature T1 was no lower than 540° C. and lower than 550° C., and the after-cooling temperature T2 was 540° C.±5° C. In the Comparative Example 2, the solution-treatment temperature T1 was 550° C., the after-cooling temperature T2 was 515° C. Further, the cooling time t2 to t3 was 125 seconds.

A tensile test piece was cut out from a predetermined part of each of the aluminum alloy plastically-processed articles according to the Examples 1 and 2 and the Comparative Examples 1 and 2, and a tensile test was performed for each of the test pieces. FIGS. 6 and 7 show results of 0.2% proof stresses measured in the tensile tests. Note that the measured value of the 0.2% proof stress was determined to be excellent when it was equal to or higher than a reference value J1, and was determined to be defective when it was lower than the reference value J1. Cooling times t2 to t3 are shown in parentheses near the plot shown in FIG. 7.

As shown in FIG. 6, in the Comparative Example 1, most of the measured values of the 0.2% proof stress were lower than the reference value J1 and hence were determined to be defective. In contrast, in the Example 1, all of the measured values of the 0.2% proof stress were equal to or higher than the reference value J1 and hence were determined to be excellent. Further, there was a tendency that the measured values in the Example 1 were higher than those in the Comparative Example 1. One of the conceivable causes for this phenomenon is that: in the Example 1, the solution-treatment temperature T1 was 550° C. and was higher than that in the Comparative Example 1; and therefore, the solution treatment for the aluminum alloy material progressed and hence the 0.2% proof stress of the aluminum alloy plastically-processed article was improved.

As shown in FIG. 7, in the Comparative Example 2, most of the measured values of the 0.2% proof stress were lower than the reference value J1 and hence were determined to be defective. In contrast, in the Example 2, all of the measured values of the 0.2% proof stress were equal to or higher than the reference value J1 and hence were determined to be excellent. Further, there was a tendency that the measured values in the Example 2 were higher than those in the Comparative Example 2. One of the conceivable causes for this phenomenon is that: in the Example 2, the after-cooling temperature T2 was 520° C. and was higher than that in the Comparative Example 2; and therefore, the state in which the solution treatment for the aluminum alloy material had sufficiently progressed was maintained and hence the 0.2% proof stress of the aluminum alloy plastically-processed article was improved.

Note that it was attempted to manufacture aluminum alloy plastically-processed articles by using the same manufacturing method as that for the Examples 1 and 2 except that the solution-treatment temperature T1 and the after-cooling temperature T2 were higher than 553° C. and no higher than 560° C. However, burning cracks occurred. Therefore, their 0.2% proof stresses could not be measured. One of the conceivable causes for this phenomenon is that the solution-treatment temperature T1 and the after-cooling temperature T2 were higher than 553° C.

As shown in FIG. 7, in the Example 2, when the cooling time t2 to t3 is zero seconds, the after-cooling temperature T2 is 550° C. and is close to the lower limit value Tmi 553° C. of the burning-crack occurring temperature range. Even if the heat treatment furnace can stably control the temperature of the aluminum alloy material within the range of ±5° C. of the target temperature, the after-cooling temperature T2 exceeds the lower limit value Tmi 553° C. of the burning-crack occurring temperature range and hence burning cracks may occur. In the Example 2, when the cooling time t2 to t3 is 45 seconds or 97 seconds, though the 0.2% proof stress is lower, burning cracks are less likely to occur as compared to when the cooling time t2 to t3 is zero seconds.

Note that the present disclosure is not limited to the above-described embodiments and they can be modified as desired without departing from the spirit and scope of the present disclosure. Further, the present disclosure may be implemented by combining the above-described embodiments and examples thereof as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing an aluminum alloy plastically-processed article, comprising:
    performing a solution treatment for an aluminum alloy material by heating and maintaining the aluminum alloy material at a solution-treatment temperature T1;
    performing plasticity processing at a temperature higher than 520° C. for the aluminum alloy material subjected to the solution treatment; and
    cooling the plastically-processed aluminum alloy material upon completing the plasticity processing, and aging the cooled aluminum alloy material, wherein
    the method further comprises, before starting the plasticity processing, a pre-plasticity-processing cooling step of cooling the aluminum alloy material subjected to the solution treatment at a temperature of no less than 520° C. while maintaining the aluminum alloy material subjected to the solution treatment in a solution state.

2. The method for manufacturing an aluminum alloy plastically-processed article according to claim 1, wherein in the pre-plasticity-processing cooling step, after the aluminum alloy material subjected to the solution treatment is cooled, a temperature T2 of the cooled aluminum alloy material is adjusted so that, in the plasticity processing step, a temperature T21 of the aluminum alloy material which has been subjected to the plasticity processing and hence in which processing heat has been generated remains lower than a lower limit value Tmi of a burning-crack occurring temperature range,
    wherein the burning-crack occurring temperature range is a temperature range at which cracking occurs.

3. The method for manufacturing an aluminum alloy plastically-processed article according to claim 1, wherein in the pre-plasticity-processing cooling step, after the aluminum alloy material subjected to the solution treatment is cooled, a temperature T2 of the cooled aluminum alloy material satisfies the following relationship:

$$(Tmi-45°\ C.) \le T2 \le (Tmi-10°\ C.).$$

4. The method for manufacturing an aluminum alloy plastically-processed article according to claim 1, wherein the solution-treatment temperature T1 satisfies the following relationship:

$$(Tmi-65°\ C.) \le T1 \le (Tmi-5°\ C.).$$

* * * * *